Aug. 3, 1926.

J. S. SOUSA 1,594,639

PULVERIZER

Filed Oct. 4, 1924

Inventor

J. S. Sousa

Attorneys

Patented Aug. 3, 1926.

1,594,639

UNITED STATES PATENT OFFICE.

JOSEF S. SOUSA, OF FERNDALE, CALIFORNIA, ASSIGNOR OF ONE-HALF TO EDWARD E. GATLIFF, OF EUREKA, CALIFORNIA.

PULVERIZER.

Application filed October 4, 1924. Serial No. 741,674.

This invention relates to agricultural machines, and more particularly to machines of the disk type employed for harrowing, pulverizing and crushing the soil preparatory to planting.

Another important object of the invention is to provide means whereby the disks may be interlocked with each other to insure against rotation of one disk with respect to the adjacent disk.

A still further object of the invention is to provide novel means whereby the disks may be readily and easily removed and replaced when they become damaged, dulled or otherwise rendered inoperative.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of an agricultural machine constructed in accordance with the invention.

Figure 2 is a fragmental sectional view through a plurality of disks illustrating the disks as supported on a shaft.

Figure 3 is a side elevational view of one of the disks.

Referring to the drawings in detail, the frame of the machine is indicated generally by the reference character 5 and includes end bars 6 which are provided with bearings 7 in which the shafts 8 operate, the shafts 8 acting as the supporting shafts for the disks 9.

These disks 9 are preferably hollow and are provided with cut out portions 10 formed at the hubs thereof, the cut out portions 10 being arranged at one side of the disks. At the opposite sides of the disks are fingers 11 formed integral therewith, which fingers 11 of one disk are designed to fit in the cut out portions 10 of the adjacent disks, to lock the disks against movement with respect to each other.

The disks 9 are slid onto the shafts 8 and properly positioned thereon, so that the disks of the rear shaft 8 will operate in a plane between adjacent disks of the forward shaft 8 so that every portion of the ground surface over which the machine is moving, will be engaged by the disks to crush or pulverize the same.

Mounted at the ends of the shafts 8 are collars 12 which are provided with set screws 13 that operate through suitable threaded openings therein and engage the shafts to lock the collars against movement, the collars being moved into close engagement with the end disks of the shafts to hold the disks into close engagement with each other and in their proper adjusted positions.

The frame 5 includes front and rear bars 14 which are connected by means of the rods 15 formed with eyes 16 at their forward ends, through which eyes the end links of the chains 17 pass providing means for connecting the draft chains 17 to the body of the machine. Nuts indicated at 18 are provided on the threaded inner ends of the rods 15 providing means whereby the rods 15 may be readily and easily positioned and secured to the frame.

The forward ends of the chains 17 have connection with the connecting ring 19, hook members 20 being provided at the forward ends of the chains to be hooked into certain links of the chains for adjusting the lengths of the chains, thereby adapting the device for use in connection with horse power or motor power.

From the foregoing it will be obvious that due to this construction, the ground surface or soil to be planted will be thoroughly crushed and pulverized by the machine.

I claim:—

An agricultural machine including a frame, shafts mounted on the frame, disks on the shafts, each of said disks including a hollow body portion formed with openings to accommodate the shafts, said shafts adapted to fit closely within the openings of the disks, fingers extending laterally from the body portion adjacent to the opening at one side of the body portion and resting on the shafts, the opening at the opposite side of the body portion, having cut out portions to receive the fingers of the adjacent disk, and securing collars at the ends of the shafts for securing the disks against movement longitudinally of the shafts.

In testimony that I claim the foregoing as my own, I have hereto affixed my signature.

JOSEF S. SOUSA.